United States Patent [19]

Shimizu et al.

[11] 4,152,738

[45] May 1, 1979

[54] MAGNETIC TAPE RECORDING AND/OR REPRODUCING APPARATUS

[75] Inventors: Ryota Shimizu; Isao Kozu, both of Katano; Takenori Akamine, Omiya, all of Japan

[73] Assignee: Matsushita Electric Industrial Co., Ltd., Kadoma, Japan

[21] Appl. No.: 823,174

[22] Filed: Aug. 8, 1977

[30] Foreign Application Priority Data

Aug. 16, 1976 [JP] Japan .................................. 51/98017

[51] Int. Cl.² .................... G11B 15/66; G11B 15/18
[52] U.S. Cl. .................................. 360/95; 360/96.1; 360/132
[58] Field of Search .................................. 360/95–96, 360/85, 132; 242/198, 199

[56] References Cited

U.S. PATENT DOCUMENTS

| 3,660,614 | 5/1972 | Swain et al. | 360/85 |
| 4,050,087 | 9/1977 | Kishi | 360/95 X |
| 4,067,051 | 1/1978 | Nakamura | 360/95 |

FOREIGN PATENT DOCUMENTS

44-20674 1/1966 Japan .................................. 360/85
1121125 7/1968 United Kingdom .................. 360/96

OTHER PUBLICATIONS

IBM Technical Disclosure Bulletin, vol. 9 #8, Jan. 1967, p. 968 "Automatic Tape Threading" Johnson et al.

*Primary Examiner*—John H. Wolff
*Attorney, Agent, or Firm*—Wenderoth, Lind & Ponack

[57] ABSTRACT

A magnetic tape recording and/or reproducing apparatus has a cam driven mechanism for moving a pressure roller from a first position within a cutout recess of a tape cassette and behind the inner side of a magnetic tape to a second position slightly spaced from a tape drive capstan. According to said movement of the pressure roller, a tape drawing pin is moved from an inoperative position within the cutout recess and behind the inner side of the magnetic tape to an operative position where the tape is drawn out of the cassette and brought into a desired tape path so as to be engaged with a magnetic head which is stationarily mounted on a base plate of the apparatus. The pressure roller is further moved to a third position in which it is pressed against the tape drive capstan by a solenoid mechanism upon energization thereof so as to move the tape.

7 Claims, 8 Drawing Figures

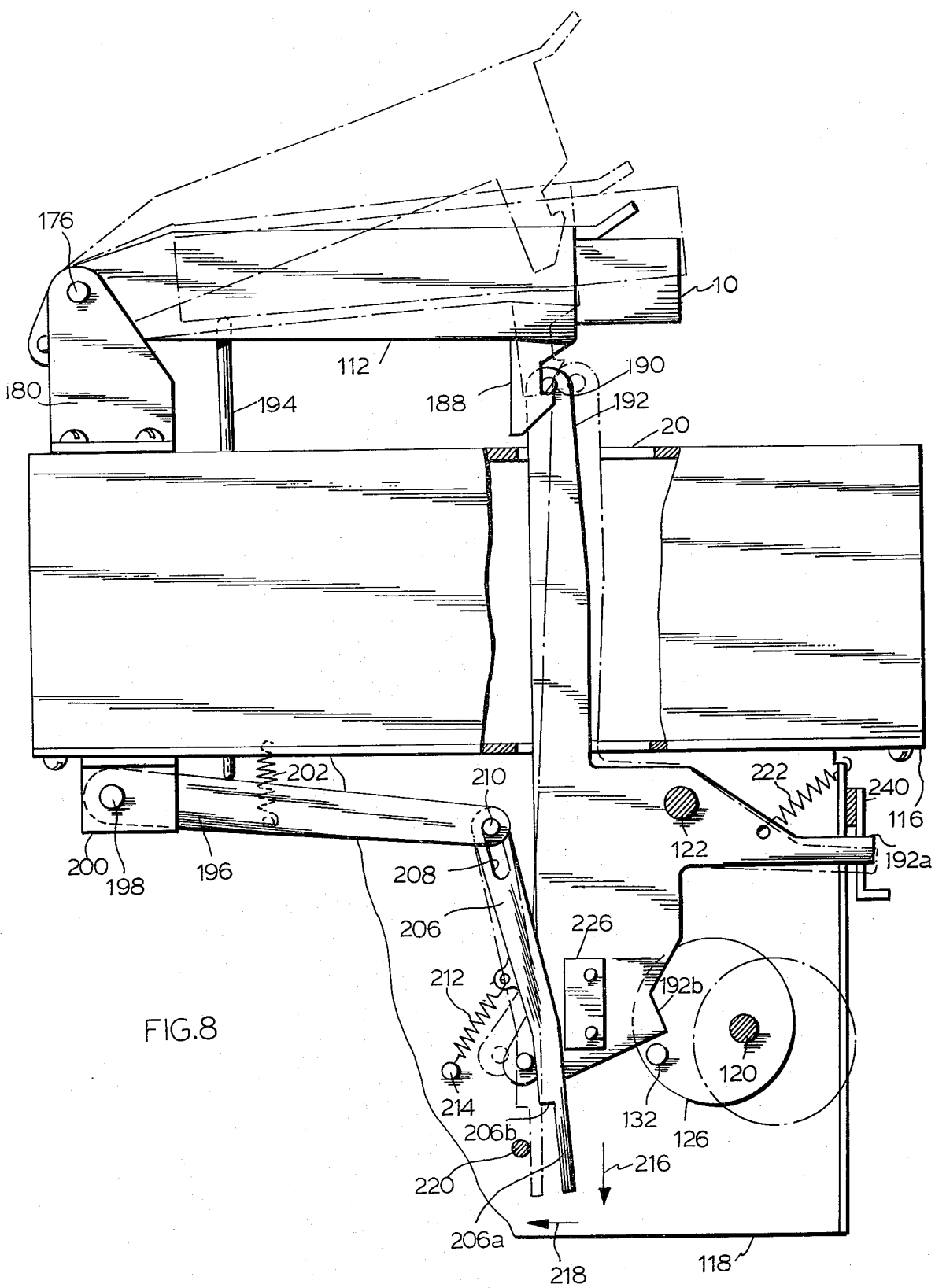

MAGNETIC TAPE RECORDING AND/OR REPRODUCING APPARATUS

BACKGROUND OF THE INVENTION

This invention relates to a tape recording and/or reproducing apparatus, and more particularly to an apparatus wherein a magnetic tape is drawn out of a tape cassette and brought into a desired tape path of travel.

It is known that, as a result of improvements in magnetic tapes and transducing heads, a very compact tape recorder utilizing tape cassettes is now widely used as a sound recording and reproducing apparatus. However, it is necessary in a tape recorder of this general type that the magnetic transducing heads move into the tape cassette to contact the magnetic tape. This movement of the heads sometimes causes breakdown of the lead wires attached to the heads and also makes it difficult to secure the heads in the required accurate operative positions.

In order to solve these problems, an improved tape recording and/or reproducing apparatus has been developed wherein a magnetic tape is drawn out of the tape cartridge and contacted with the magnetic transducing heads secured on a stationary head base plate of the apparatus. Although such improved apparatus solves the foregoing problems, it is not entirely free from drawbacks. In the apparatus of this kind, the tape drawing mechanism is apt to exert an undesirable force on the tape and to make unpleasant noises during its operation. In addition, such apparatus is apt to have a complicated structure for providing a secure tape guiding system especially for recording and/or reproduction of signals on narrow tracks defined along the tape.

Accordingly, it is readily evident that the tape drawing and the tape guiding must be accomplished with relative reliability, accuracy and, in a commercial product, with structure which can be built at a small expense. Accordingly, there has been a need for an improved tape drawing mechanism and an improved tape guiding system of the kind described herein.

SUMMARY OF THE INVENTION

It is, therefore, an object of this invention to provide a magnetic tape recording and/or reproducing apparatus which is simple to operate, inexpensive to manufacture and reliable in operation for drawing the magnetic tape out of the tape cassette.

Another object of this invention is to provide a magnetic tape recording and/or reproducing apparatus having a tape guiding system suitable for the apparatus, in which the magnetic tape is drawn out of the tape cassette and brought into a desired tape path of travel.

Still another object of this invention is to provide a magnetic tape recording and/or reproducing apparatus which can achieve a smooth and quiet operation of the tape drawing mechanism by means of a rotary cam included therein.

A further object of this invention is to provide a magnetic tape recording and/or reproducing apparatus comprising a tape drawing mechanism having parts simply and compactly constructed.

A still further object of this invention is to provide a magnetic tape recording and/or reproducing apparatus having a simple adjusting system for accurately placing a tape transport element in its operative position.

These objects are achieved according to this invention by providing a magnetic tape recording and/or reproducing apparatus which handles a tape cassette provided with a cutout recess at a front portion thereof and a front opening from which a magnetic tape can be drawn out of the tape cassette, and which comprises a tape drive capstan, a magnetic head mounted on a chassis, a pressure roller rotatably mounted on a pressure roller level to move the magnetic tape in cooperation with the capstan, the pressure roller being adapted to be located in a first position within the cutout recess of the cassette and behind the inner side of the magnetic tape, tape drawing means movable from an inoperative position to an operative position in response to the movement of the pressure roller lever so as to draw the magnetic tape out of the tape cassette, spring means for urging the pressure roller toward the capstan, driving means for driving the pressure roller lever, cam means driven by a motor to move the driving means from an first position where the tape drawing means is in the inoperative position and the pressure roller is in the first position, to a second position where the tape drawing means is in the operative position and the pressure roller is brought to a second position slightly spaced from the capstan, means for restricting the movement of the driving means at the second position against the biasing force of the spring means to disengage the same from the cam means, and a solenoid for releasing the restricting means upon energization thereof to permit the movement of the driving means from the second position to a third position in which the pressure roller is brought to a third position in which it is pressed against the capstan by the spring means.

Further objects and advantages of this invention will become apparent from the following detailed description considered in connection with the accompanying drawings.

BRIEF DESCRIPTION OF THE DRAWINGS

FIG. 8 is a fragmentary view of FIG. 5 showing the operation for initiating the operation of the tape drawing mechanism.

DETAILED DESCRIPTION OF A PREFERRED EMBODIMENT

Figure 1:
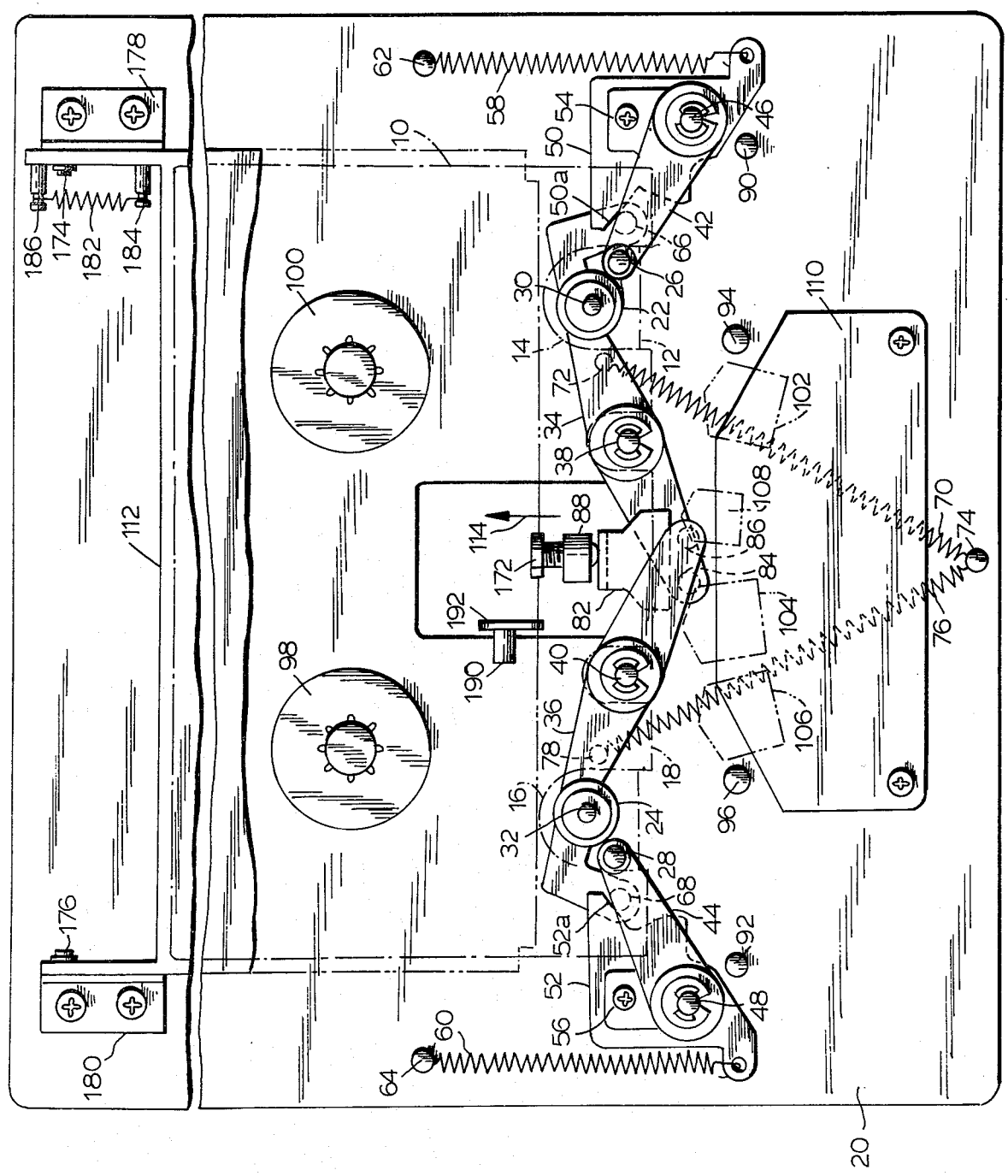
FIG. 1 is a schematic top plan view of an example of a magnetic recording and/or reproducing apparatus according to this invention in an inoperative state for receiving a tape cartridge.

Referring now to the drawings, there will be explained one example of a tape recording and/or reproducing apparatus according to this invention.

A tape cassette, schematically shown in dot-dash lines and indicated by the reference numeral 10, includes a magnetic tape 12 wound on and extending between two tape reels rotatably contained therein and has a pair of cutout recesses 14 and 16, and an opening 18 therein. A significant length of the tape 12 is arranged to extend parallel to one of the longer sides of the cassette 10, and is exposed through the opening 18.

The tape cassette 10 can be set on a base chassis 20. A pair of pressure rollers 22 and 24 and a pair of tape drawing pins 26 and 28 are respectively adapted to be received within the cutout recesses 14 and 16 of the cassette 10. The pressure rollers 22 and 24 are rotatably mounted on shafts 30 and 32 on pressure roller levers 34 and 36, respectively, which are respectively pivotally supported on shafts 38 and 40 fixed on the base chasssis 20.

The tape drawing pins 26 and 28 are secured on tape drawing levers 42 and 44, respectively, which are respectively pivotally supported on shafts 46 and 48 fixed on the base chassis 20. The levers 42 and 44 are connected with plates 50 and 52 by screws 54 and 56, respectively. The lever 42 is urged counterclockwise by a spring 48 which is connected between the plate 50 and a pin 62 fixed on the base chassis 20. The lever 44 is urged clockwise by a spring 60 which is connected between the plate 52 and a pin 64 fixed on the base chassis 20.

A stop pin 66 is fixed on one end of the lever 34 and a stop pin 68 is fixed on one end of the lever 36. Both of the pins 66 and 68 serve to restrict pivotal movement of the plates 50 and 52 respectively by abutment against an edge 50a of the plate 50 and an edge 52a of the plate 52.

A spring 70 is connected between a pin 72 fixed on the lever 34 and a pin 74 fixed on the base chassis 20. A spring 76 is connected between a pin 78 fixed on the lever 36 and the pin 74. Swinging motion of the levers 34 and 36 caused by the biasing force of the springs 70 and 76 is restricted by an L-shaped leaf spring 82 due to engagement of an edge of the leaf spring 82 with driven pins 84 and 86 fixed on the opposite end portions of the levers 34 and 36, respectively, from the pins 66 and 68. The leaf spring 82 is mounted on a driving lever 88 as may be best seen in FIG. 5.

Stop posts 90 and 92 are fixed on the base chassis 20 and arranged to abut the edge 50a of the plate 50 and the edge 52a of the plate 52, respectively. A pair of tape drive capstans 94 and 96 are rotatably mounted on the base chassis 20. A take-up reel drive turntable 98 and a supply reel drive turntable 100 are also rotatably mounted on the base chassis 20. An erase head 102, a record head 104, a reproducing head 106 and a control head 108 are fixedly mounted on a head base 110 which is fixed on the base chassis 20.

A cassette loading holder 112 is adapted to be pivotally moved between a raised or inoperative position in which the cassette 10 can be inserted, and an operative position in which the tape reels contained within the cassette 10 are coupled to the reel drive turntables 98 and 100. When the cassette loading holder carries the cassette 10 and sets the same on the base chassis 20, the pressure rollers 22 and 24 and the tape drawing pins 26 and 28 are received within the cutout portions 14 and 16 of the cassette 10 and behind the inner side of the tape 12 included in the cassette 10 as shown in FIG. 1.

Figure 2:
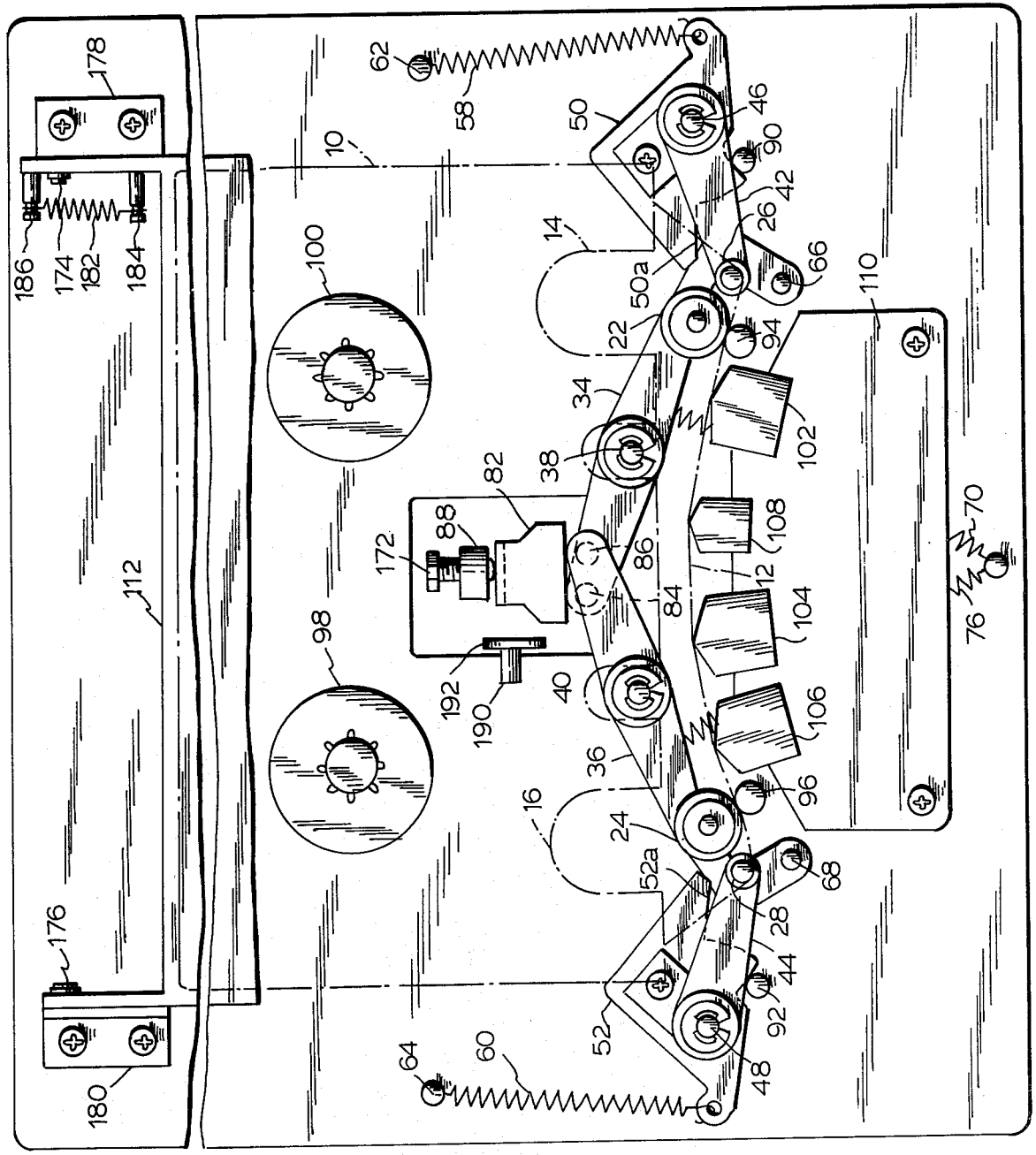
FIG. 2 is a schematic top plan view of the apparatus of FIG. 1 in an operative state where the tape is drawn out of the tape cassette and brought into a desired tape path of travel.

The arrow 114 represents the movemennt of the driving lever 88 from its first position shown in FIG. 1 to its third position shown in FIG. 2. As the driving lever 88 moves in the direction as indicated by the arrow 114, the lever 34 is moved clockwise and the lever 36 is moved counterclockwise by the spring 76 from their first positions shown in FIG. 1 to their third positions shown in FIG. 2 according to the movement of the driving lever 88 so as to move the pressure rollers 22 and 24 out of the cutout recesses 14 and 16, respectively, and toward the capstans 94 and 96, respectively. In response to the movement of the levers 34 and 36, the lever 42 is moved counterclockwise and the lever 44 is moved clockwise from their inoperative positions shown in FIG. 1 so as to move the tape drawing pins 26 and 28 out of the cutout portions 14 and 16, respectively, to draw the tape 12 out of the cassette 10.

When the pressure rollers 22 and 24 reach their second positions near the capstans 94 and 96 and are slightly spaced therefrom, the movement of the levers 50 and 52 is stopped by the abutment of the edges 50a and 52a against the posts 90 and 92, respectively, so that the levers 42 and 44 stop with the levers 34 and 36 carrying pressure rollers 22 and 24 moving further to move pins 66 and 68 away from levers 42 and 44, whereby the levers 42 and 44 attain their operative positions shown in FIG. 2 to securely place the tape 12 in the desired tape path of travel. When levers 34 and 36 are released, as described below, further movement of levers 34 and 36 due to the tension of springs 70 and 76 brings rollers 22 and 24 against capstans 94 and 96.

Figure 3:
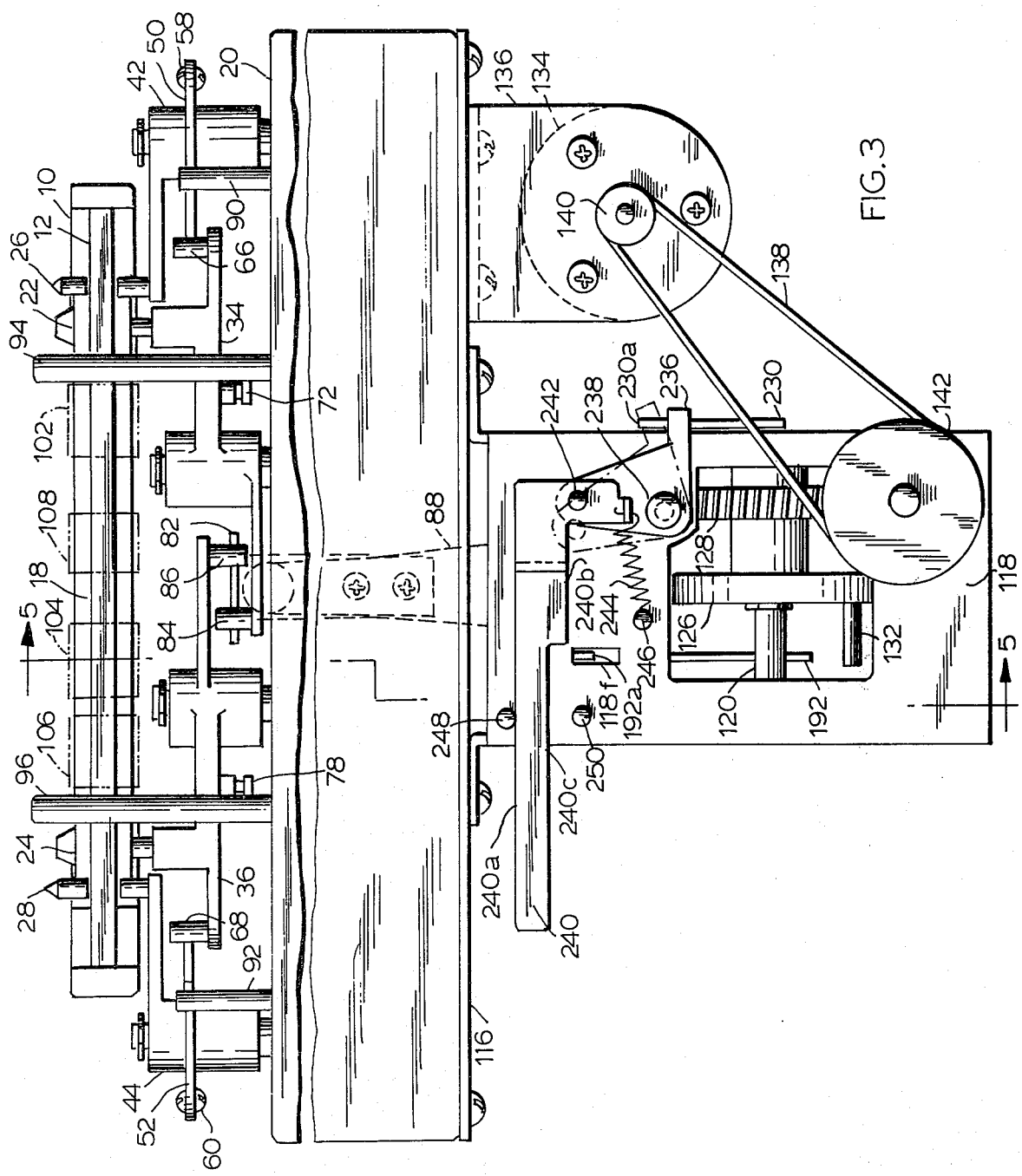
FIG. 3 is a front elevational view showing in detail positions of members in the apparatus as shown in FIG. 2.
Figure 4:
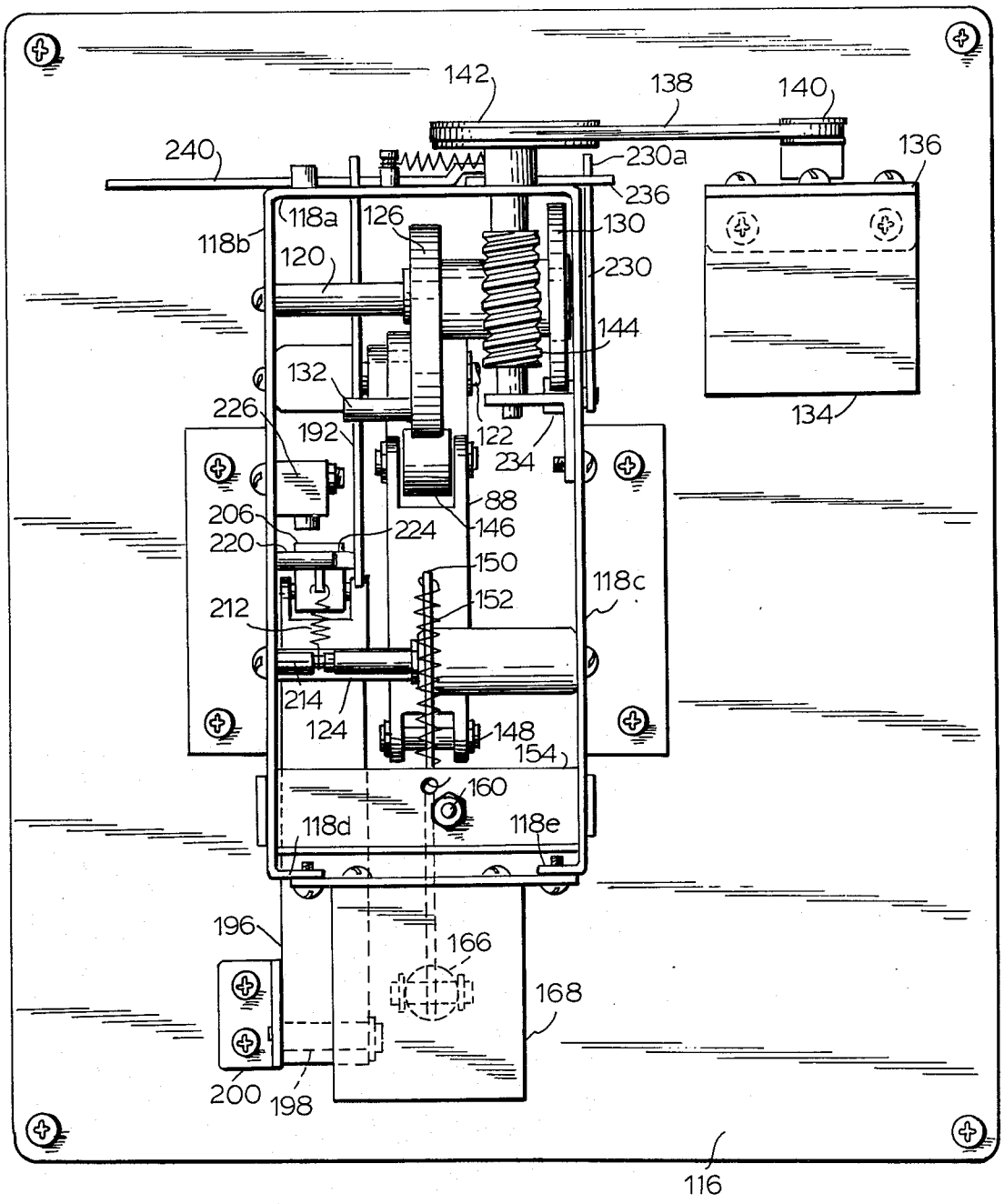
FIG. 4 is a rear elevational view of the apparatus of FIG. 1.
Figure 5:
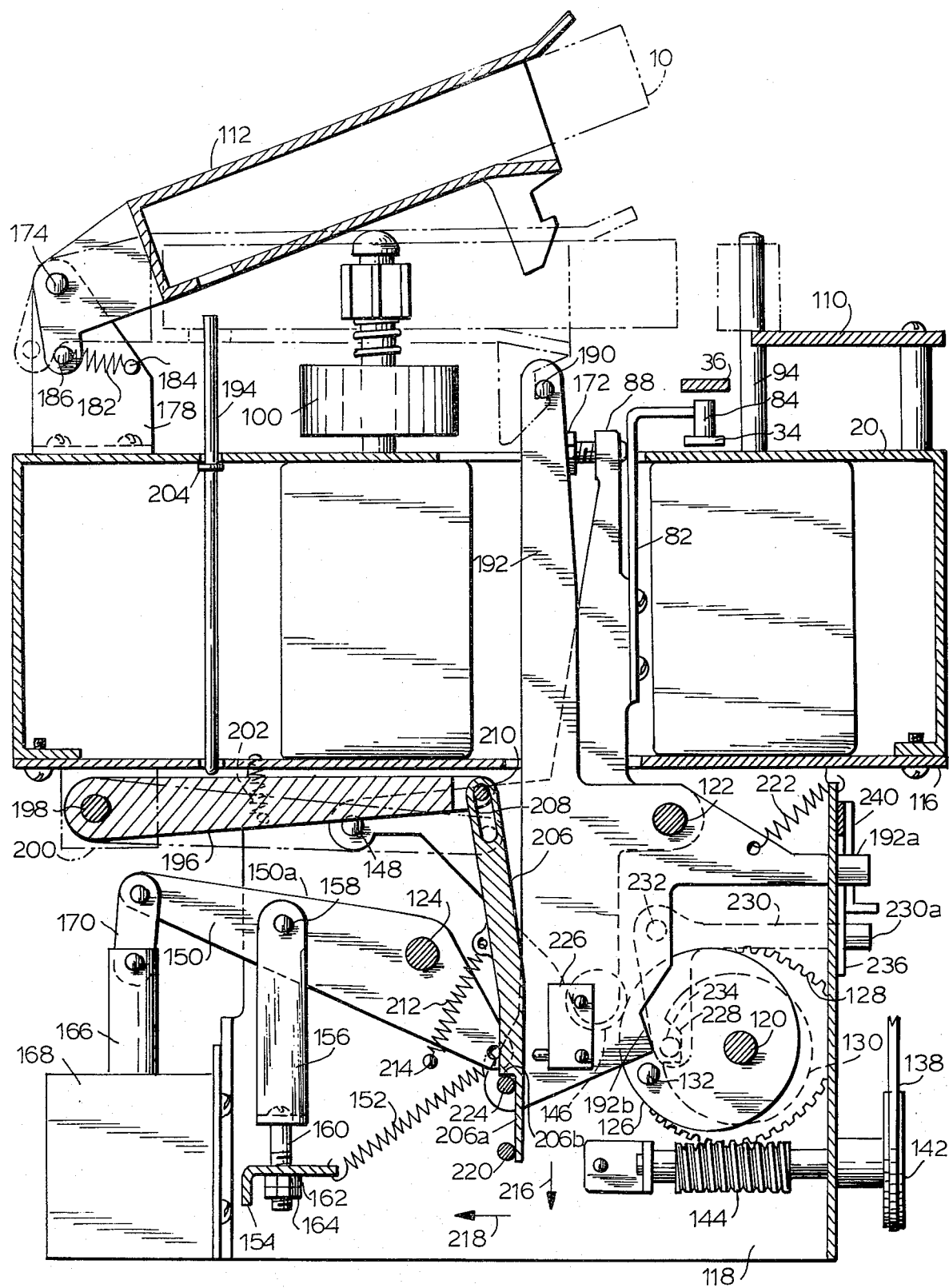
FIG. 5 is a side elevational view partly in section taken along the line 5—5 of FIG. 3.

Referring now to FIG. 3 to FIG. 5, it will be seen that mechanisms for moving the lever 88 are mounted on a back chassis 116. A bracket 118 is secured on the back chassis 116, and consists of a top wall 118a, a pair of side walls 118b and 118c and a pair of bottom walls 118d and 118e. A cam shaft 120, a center shaft 122 and a shaft 124 are supported between the side walls 118b and 118c. A disk cam 126, a worm wheel 128 and a detent disk 130 are connected to each other as a single unit and are rotatably supported by the shaft 120.

A pin 132 is fixed on the disk cam 126 as may be best seen in FIG. 4. An electric motor 134 is mounted on a motor bracket 136 secured to the back chassis 116. A belt 138 is connected between a pulley 140 on the output shaft of the motor 134 and a pulley 42 which is fixed to one end of a worm 144. The worm 144 is rotatably supported on the bracket 118 and meshed with the worm wheel 128.

The driving lever 88 is pivotally supported on the center shaft 122 and is urged counterclockwise by the springs 70 and 76. The driving lever 88 has a cam follower 146 rotatably mounted on one end thereof and a stop pin 148 fixed on another end thereof as shown in FIG. 5. In the initial position of the cam 126, the cam 126 restricts the counterclockwise movement of the driving lever 88 by driving the cam follower 146 and the L-shaped leaf spring 82 as shown by broken lines in FIG. 6, whereby the pressure rollers 22 and 24 and the tape drawing pins 26 and 28 are positioned within the cutout recesses 14 and 16 of the tape cassette 10 and behind the inner side of the magnetic tape 12 included within the tape cassette 10 as shown in FIG. 1.

A plunger lever 150 is pivotally supported on the shaft 124 and urged in the clockwise direction by a spring 152 connected between one end of the lever 150 and a plate 154 secured to the side walls 118b and 118c. One end of a link 156 is pivotally connected by a pin 158 fixed on the lever 150, and another end of the link 156 is connected to a bolt 160 which is inserted into a hole in the plate 154. The sliding movement of the bolt 160 is limited by nuts 162 and 164, whereby the clockwise movement of the lever 150 is limited by abutment of the nut 162 against the plate 154 as indicated by solid lines in FIG. 6. The other end of the lever 150 is pivotally connected to a plunger 166 of a solenoid 168 through a link 170.

When the motor 134 is energized to run and causes the worm wheel to rotate, the driving lever 88 is permitted to move counterclockwise in response to counterclockwise rotation of the cam 126 which has one working surface having a decreasing radius from the axis of the cam shaft 120. The lever 150 restricts the movement of the driving lever 88 by abutment of an edge 150a against the stop pin 148 and holds the lever 88 at the second position indicated by the solid lines in FIG. 6. The cam 126 still rotates and moves out of engagement with the cam follower 146 and reaches its rest position as indicated by the solid lines in FIG. 6, whereby the pressure rollers 22 and 24 reach their second positions near the capstans 94 and 96, with slight clearances remaining therebetween, and the tape drawing pins 26 and 28 draw out the magnetic tape to bring the same into the desirable tape path.

Figure 6:
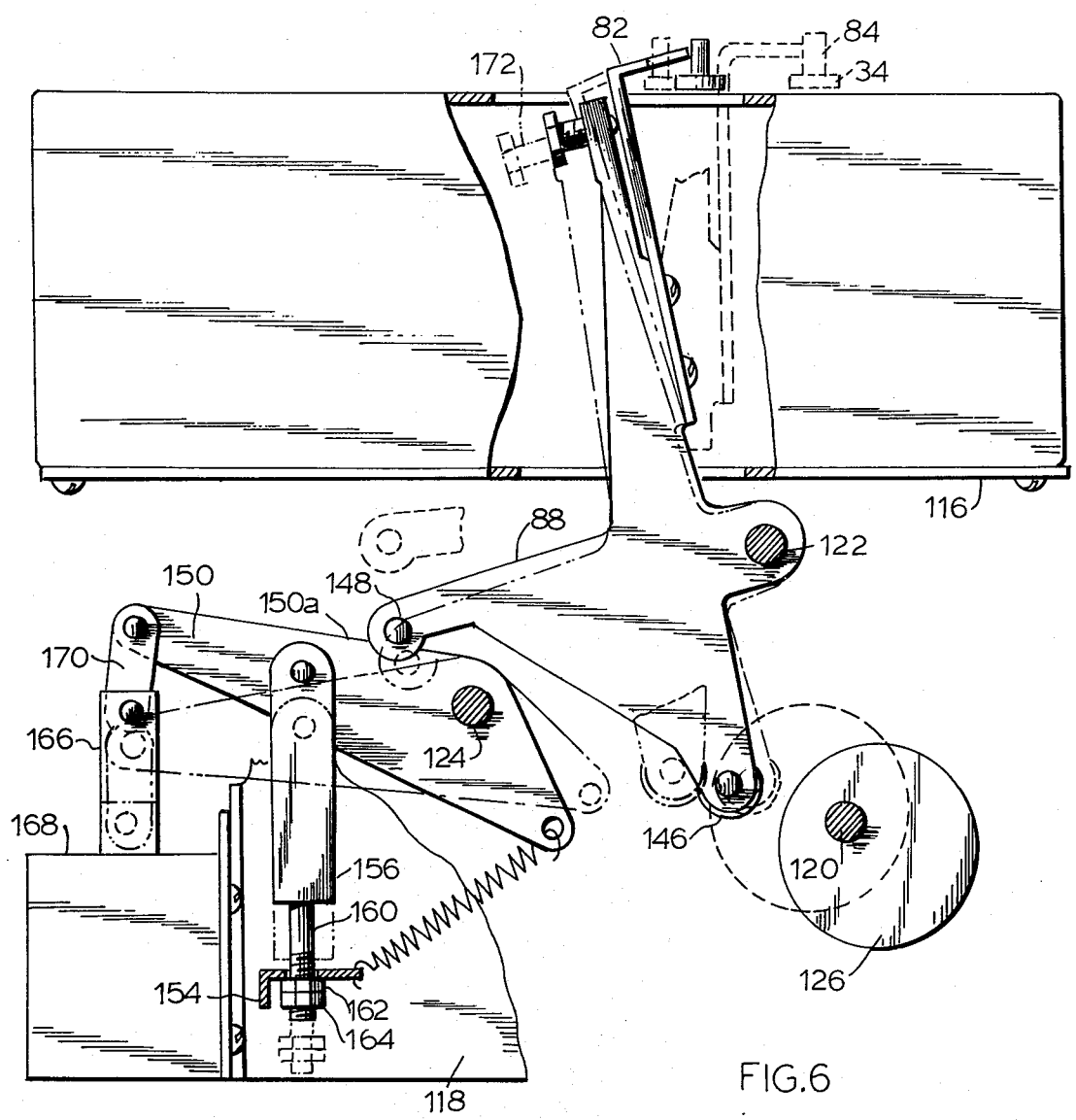
FIG. 6 is a fragmentary view of FIG. 5 showing the steps in the sequence of operation of the apparatus.

The driving lever 88 is further moved to the third position in response to the counterclockwise movement of the lever 150 to a withdrawn position when the solenoid 168 is activated, and both of the positions are indicated by two-dot chain lines in FIG. 6, whereby the pressure rollers 22 and 24 press the magnetic tape against the capstan 94 and 96 as shown in FIG. 2. In this arrangement, the driving lever 88 returns to the second position indicated by the solid lines under the urging force of the spring 152 when the solenoid is deactivated, whereby the pressure rollers 22 and 24 return to their second positions.

An adjusting bolt 172 is threadedly mounted on the top end of the driving lever 88. The tip of the bolt 172 abuts the back face of the leaf spring 82 to bend the same, whereby fine adjustment in the positioning of the pressure rollers 22 and 24 at their second positions can be easily achieved by an advancing or retracting rotation of the bolt 172.

The cassette loading holder 112 is pivotally supported on shafts 174 and 176 fixed on brackets 178 and 180 secured on the base chassis 20 as shown in FIG. 1. A spring 182 is connected between a pin 184 fixed on the bracket 178 and a pin 186 fixed on the holder 112 so as to urge the holder 112 toward the raised or inoperative position thereof as shown in FIG. 5.

A latch member 188 is securely mounted on a back face of the cassette loading holder 112. A latch pin 190 adapted to catch the latch member 188 is fixed on one end of a latch lever 192, hereinafter described in more detail, so as to lock the holder 112 at said operative position thereof.

A detection rod 194 is slidably supported by the base chassis 20 and the back chassis 116. One end of the detection rod 194 extends in the cassette chamber of the cassette loading holder 112 when it is located in its operative position, and the other end of the detection rod 194 abuts a detection arm 196 which is pivotally supported by a shaft 198 fixed on a bracket 200 secured to the back chassis 116. A spring 202 is connected between the detection arm 196 and the back chassis 116 to urge the former in the counterclockwise direction. The movement of the rod 194 in the direction toward the holder 112 is limited by a stop 204 as shown in FIG. 5.

One end of a switch arm 206 has a slot 208 therein which engages a connecting pin 210 fixed to the end of the detection arm 196. The other end of the switch arm 206 has a step face 206a and a detent face 206b thereon. A spring 212 is connected between the switch arm 206 and a pin 214 fixed on the side wall 118b to urge the former in the directions as indicated by the arrow 216 and the arrow 218 in FIG. 5. Sliding movement of the arm 206 indicated by the arrow 216 is limited by the pin 210 on the arm 196 since the urging force of the spring 202 is greater than that of the spring 212. Pivotal movement of the arm 206 indicated by the arrow 218 is limited by a pin 220 fixed on the side wall 118b, more specifically by abutment of the pin 220 against the step face 206a of the arm 206. As thus arranged, the switch arm 206 is held in a rest position when the movement of the rod 194 is limited by the stop 204.

The latch lever 192 is pivotally supported by the center shaft 122 and is urged counnterclockwise by a spring 222 connected between the lever 192 and the top wall 118a. A driven pin 224 is fixed on one end of the latch lever 192. Pivotal movement of the lever 192 is limited by the arrangement of a projection 192a on the lever 192 in a slot 118f (not shown in FIG. 5 but in FIG. 3) in a manner so as to cause the latch pin 190 to be caught by the latch member 188 and to cause the driven pin 224 to be positioned adjacent to the step face 206a with a small gap therebetween when the step face 206a abuts the pin 220. A micro switch 226 for energizing the electric motor 134 is mounted on the side wall 118b adjacent the switch arm 206.

When the tape cassette is received within the cassette loading holder 112 and moved to its operative position, the mechanism described above operates as follows. Before the cassette loading holder 112 is moved clockwise to the position represented by two-dot chain lines in FIG. 8, the detection arm 196 is moved clockwise in response to the sliding movement of the rod 194 when the rod 194 is pushed by a bottom wall of the cassette 10. Thus, the switch arm 206 is moved under the urging force of the spring 212 from the rest position to a position where the detent face 206b abuts the pin 224. As the cassette loading holder 112 reaches the aforesaid position, the latch member 188 moves the latch lever 192 in the clockwise direction, and then the detent face 206b is disengaged from the pin 224 to permit the switch arm 206 to slide further in the direction indicated by the arrow 216.

As the cassette loading holder 112 is further moved clockwise, the latch lever 192 is restored to lock the latch member 188, so as to place the holder 112 in its operative position and the tape cassette 10 on the base chassis 20. Then the switch arm 206 is lifted up and actuates the microswitch 226 so as to initiate the tape drawing operation. It will be understood that the tape drawing operation is initiated in response to the movement of the latch lever 192 to lock the latch member 188 when the tape cartridge is received within the cassette loading holder 112.

When the tape cassette 10 is not received within the cassette loading holder 112, the mechanism described above operates as follows. In spite of the clockwise movement of the cassette loading holder 112 or the movement of the latch lever 192 to lock the latch member 118, the switch arm 206 is held in the rest position since there is no tape cassette 10 to push the detection rod 194. Thus, the micro switch 226 is not actuated. It will be understood that the tape drawing operation is not initiated in spite of the movement of the latch member 188 to lock the latch member 188 when the tape cassette 10 is not received within the cassette loading holder 112.

When the cassette loading holder 112 is not in its operative position and the detection rod 194 is accidentally pushed by manual operation, the mechanism described above operates as follows. By the sliding movement of the detection rod 194 caused by manual operation, the switch arm 206 is moved to a position where the detent face 206b abuts the pin 224, and consequently the arm 206 remains in position, whereby the micro switch 226 is not actuated. This provides a safety device for preventing the micro switch 226 from being actuated when the detection rod 194 is accidentally pushed by manual operation, whereby unnecessary operation of tape drawing mechanism can be avoided.

In addition to the foregoing description, a switch means (not shown) is provided to energize the electric motor 134 when the cam 126 attains its rest position as indicated by the solid lines in FIG. 6, whereby the magnetic tape 12 is completely drawn out of the tape cassette 10.

A mechanism now to be described serves to restore the cassette loading holder 112 to its raised position upon counterclockwise rotation of the cam 126. The latch lever 192 has a cam portion 192b adapted to engage the pin 132 fixed on the cam 126.

When an ejecting or tape drawing back operation is manually selected by depressing an "eject" button (not described), the motor 134 is energized to rotate the cam 126 counterclockwise from its rest position to its initial position. Before the cam 126 rotates to the position where the pin 132 abuts the cam portion 192b of the latch lever 192, the driving lever 88 is moved from its second position to its first position and other means (not described) is operated to wind up the tape 12 onto one of the reels of the cassette in cooperation with the rotation of the cam 126, whereby the magnetic tape 12 is drawn back to the tape cassette 10. The latch lever 192 is moved clockwise by the sliding engagement of the pin 132 against the cam portion 192b thereof in response to further rotation of the cam 126 to its initial position so as to disengage the latch member 188 from the pin 190.

Figure 7:
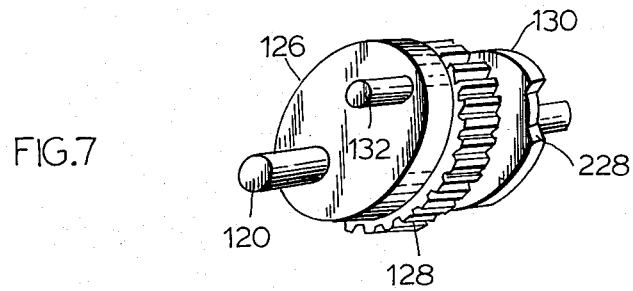
FIG. 7 is a perspective view of a cam and other members which are connected to each other as a single unit.

A mechanism now to be described serves to restore the cassette loading holder 112 to its raised position by manual operation when the apparatus is in the inoperative state. The detent disk 130 described above has a detent notch 228 in its circumferential surface as shown in FIG. 7. A detent lever 230 is pivotally supported by a shaft 232 fixed on the side wall 118c and has a projection 230a. A detent pin 234 is fixed on one end of the detent lever 230.

When the cam 126 rotates counterclockwise from its initial position where the detent 228 receives the detent pin 234, the detent pin 234 is shifted out of the detent notch 228 to abut the circumferential surface of the disk 130 so as to move the detent lever 230 in the clockwise direction.

Referring now to FIG. 3, it will be seen that the projection 230a on the detent lever 230 engages a link lever 236 pivotally supported by a shaft 238 fixed on the top wall 118a.

An eject lever 240 is pivotally supported by a shaft 242 fixedly mounted on the link lever 236 and has a back edge 240a and a step edge having an upper edge 240b and a lower edge 240c. A spring 244 is connected between the lever 240 and a pin 246 fixed on the top wall 118a to urge the lever 240 to rotate the lever 236 counterclockwise. A limit pin 248 adapted to abut against the back edge 240a and a limit pin 250 adapted to abut against the lower edge 240c are fixed on the top wall 118a. The counterclockwise movement of the lever 236 is limited by the projection 230a.

When the detent pin 234 is received within the detent notch 228 of the detent disk 130, the link lever 236 is in its first position indicated by full lines in FIG. 3.

When the pin 234 moves out of the notch 228 and abuts the circumferential surface of the detent disk 130, the lever 236 is moved to its second position indicated by dot-dash lines in FIG. 3. According to this movement of the lever 236 from its first position to its second position, the eject lever 240 moves from its first position, where the back edge 240a abuts the limit pin 248 and the upper edge 240b is not capable of being engaged with the projection 192a of the latch lever 192, to its second position where the back edge 240a abuts the limit pin 248 and the upper edge 240b is capable of being engaged with the projection 192a.

When an ejecting operation is manually selected by depressing the "eject" button as aforesaid, other means (not described) operates to move the eject lever 240 in the counterclockwise direction to a position where the lower edge 240c abuts the limit pin 250. The projection 192a can be moved by the upper edge 240b in response to the counterclockwise movement of the lever 240 when the lever 240 is in its second position, while the projection 192a cannot be moved in spite of the counterclockwise movement of the lever 240 when the lever 240 is in its first position since the abutment of the lower edge 240c against the limit pin 250 prevents the lower edge 240c from being engaged with the projection 192a.

As thus arranged, the cassette loading holder 112 can be restored to its raised position by said manual operation when the tape 12 is not drawn out of the cassette 10, while the holder 112 remains in its operative position in spite of said manual operation until the latch lever 192 is moved in response to the rotation of the cam 126 when the tape 12 is drawn out of the cassette 10.

It is apparent that various modifications may be made without departing from the spirit of the invention. The above described specific example is intended merely to illustrate the various facets in a certain selective embodiment of the invention, the scope of which it is intended shall be limited only by the following claims.

What is claimed is:

1. A magnetic tape recording and/or reproducing apparatus for handling a tape cassette which is provided with a cutout recess at a front portion thereof and a front opening from which a magnetic tape can be drawn out of the tape cassette, said apparatus comprising: a tape drive capstan; a chassis; a magnetic head mounted on said chassis for recording and/or reproducing information signals on the magnetic tape; a pressure roller lever pivotally mounted on said chassis; a pressure roller rotatably mounted on said pressure roller lever for moving the magnetic tape into cooperation with said capstan at a third position of said pressure roller where said pressure roller presses the magnetic tape against the capstan, said pressure roller being movable, upon the pivotal movement of said pressure roller lever, from a first position within said cutout recess of the cassette and behind the inner side of the magnetic tape; tape drawing means on said chassis movable from an inoperative position to an operative position in response to the movement of said pressure roller lever for drawing the magnetic tape out of the tape cassette; spring means connected to said pressure roller lever for urging said pressure roller toward said capstan; driving means coupled to said pressure roller lever for controlling the movement of said pressure roller lever at least in the direction of the biasing force of said spring means; motor driven cam means engaged with said driving means for moving said driving means from the first position thereof where said tape drawing means is in the inoperative position thereof and said pressure roller is in the first position thereof, to a second position where said tape drawing means is in the operative position thereof and said pressure roller is in a second position spaced slightly from said capstan and with a speed of movement such that said driving means is abutted by said pressure roller lever due to the rotational force exerted on said pressure roller lever by the biasing force of said spring means for causing said pressure roller lever to move more slowly than if it were free to move due to the rotational force of said spring means alone; restricting means engaged with said driving means for restricting the movement of said driving means at the second position thereof against the biasing force of said spring means for disengaging said driving means from said cam means; and a solenoid connected to said restricting means for releasing said restricting means upon energization thereof for permitting the movement of said driving means from the second position thereof to a third position whereby said pressure roller is brought to the third position whereby said pressure roller is brought to the third position thereof by said spring means.

2. An apparatus according to claim 1, wherein said tape drawing means comprises: a tape drawing pin positionable in the first position thereof within said cutout recess of the cassette and behind the inner side of the magnetic tape; and a drawing lever on which said drawing pin is in the first position thereof to an operative position where said tape drawing pin moves the magnetic tape into a desired tape path in response to the movement of said pressure roller lever, whereby the magnetic tape is engaged with the magnetic head.

3. An apparatus according to claim 1, wherein said driving means comprises: a leaf spring mounted on said driving means and engaged with said pressure roller lever; and adjusting means on said driving means for bending said leaf spring for providing the required clearance between said pressure roller in the second position thereof and said tape drive capstan.

4. An apparatus according to claim 1, which further comprises: a cassette holder movable between a raised position where said tape cassette can be inserted into said cassette holder, and an operative position where said tape cassette is brought to an operative position; latch means for latching said cassette holder at the operative position thereof; and switch means cooperable with said cassette holder for energizing said motor when said cassette holder which has a tape cassette inserted therein is latched at its operative position by said latch means.

5. An apparatus according to claim 4, wherein said switch means comprises: an electric switch for energizing said motor; a detection device for detecting the presence of a tape cassette in said cassette holder; and an actuating device connected with said detection device for actuating said electric switch, when said cassette holder which has a tape cassette insterted therein is latched at its operative position by said latch means.

6. An apparatus according to claim 5, wherein said detection device comprises a detection rod slidably disposed on said chassis in a position for having a free end thereof abutted by and moved by the bottom face of a tape cassette in said cassette holder when said cassette holder is moved to the operative position.

7. An apparatus according to claim 5, wherein said actuating device comprises: an actuator movable between a first position where said electric switch is not actuated and a second position where said electric switch is actuated; and a safety mechanism connected to said latch means and cooperable with said actuator for permitting said actuator to move from the first position thereof to the second position thereof only when said cassette holder is latched by said latch means at the operative position thereof when said tape cassette is in the operative position thereof.

* * * * *